United States Patent Office 3,380,937
Patented Apr. 30, 1968

3,380,937
PROCESS FOR POLYMERIZING TETRAFLUORO-
ETHYLENE EPOXIDE
William John Keller, Wilmington, Del., assignor to E. I.
du Pont de Nemours and Company, Wilmington, Del.,
a corporation of Delaware
No Drawing. Continuation-in-part of application Ser. No.
417,819, Dec. 11, 1964. This application Oct. 29, 1965,
Ser. No. 505,727
7 Claims. (Cl. 260—2)

ABSTRACT OF THE DISCLOSURE

The polymerization of tetrafluoroethylene epoxide by contacting same with tertiary amine catalyst and copper or a metal salt at a temperature within the range of about −110° C. to −30° C.

---

This application is a continuation-in-part of Ser. No. 417,819, filed Dec. 11, 1964 and now abandoned.

A method for preparing the epoxide monomer is described in U.S. Pat No. 2,451,185. The polymerization of this monomer in the presence of an activated charcoal catalyst at a temperature of −80° C. to +40° C. is described in U.S. Patent No. 3,125,599.

It is an object of the present invention to provide a different catalyst for this polymerization reaction. Another object is to provide a new process for polymerizing tetrafluoroethylene epoxide to polyethers. These and other objects will appear hereinafter.

It has been found that tertiary amine will catalyze the polymerization of tetrafluoroethylene epoxide to a polyether. It has also been found that the presence of certain metal salts in the polymerization medium has the adjuvant effect of increasing the rate of reaction. This effect is synergistic because the metal salts used by themselves, i.e. in the absence of tertiary amine, do not act as a catalyst for the polymerization of tetrafluoroethylene epoxide. Thus, the present invention may be described as comprising contacting tetrafluoroethylene epoxide at a temperature of about −110° C. to −30° C. with a catalytic amount of tertiary amine in the presence of an adjuvant amount of copper or a metal salt, the metal being selected from the group consisting of copper and Group I-A metals and the salt being selected from the group consisting of fluoride and carbonate and obtaining as a result thereof a polymer of tetrafluoroethylene epoxide. By "adjuvant amount" is meant that which increases the rate of polymerization over the rate obtained with the same amount of tertiary amine used alone.

With respect to process characteristics, the polymerization vessel can be glass, quartz, stainless steel, glass-lined steel or similar materials. For convenience, glass is generally used. If desired, the catalyst can be dissolved in suitable inert solvents such as mixed perfluorinated cyclic ethers, commercially available as FC-75, or slurried in an inert liquid. It is frequently convenient to introduce the tertiary amine catalyst to the monomer in a sealed container which can then be broken inside the reaction zone.

The polymerization is carried out in closed vessels generally at autogenous pressure, which may be subatmospheric at temperatures below −63° C. or superatmospheric at temperatures above −63° C., the boiling point of tetrafluoroethylene epoxide. The presence of inert solvents during the polymerization is not required, but may be desirable for dilution of the monomer or to assist in swelling and dispersing the homopolymer.

As mentioned, the polymerization occurs at temperatures ranging from about −110° C. to about −30° C. The temperature range of from about −80° C. to about −40° C. is preferred. As the temperature of polymerization is raised, the molecular weight of the resulting polymer tends to be lower.

The amount of catalyst mixture employed is not critical. Generally from about 0.0005 to about 0.05 mole of amine per mole of tetrafluoroethylene epoxide, together with from about 0.0005 to about 0.01 gram equivalents of the copper or metal salt per mole of tetrafluoroethylene epoxide are employed.

Representative tertiary amines which may be used in the process of the invention are aliphatic tertiary amines such as trimethyl amine, triethylamine, tributylamine, trihexylamine; and cyclic amines such as N-methylmorpholine, N,N-dimethylpiperazine, N-ethylpiperidine, pyridine, 2,6-dimethylpyridine, and 2,4,6-trimethylpyridine. Preferred tertiary amines are triethylamine and N-ethylpiperidine which are readily available and convenient to use. Mixtures of tertiary amines may also be used. The tertiary amines need not be specially purified to be operable in the process of the invention. As much as about 5% of water or a secondary amine based on the weight of the tertiary amine catalyst has no noticeable adverse effect on the polymerization.

The use of adjuvant amounts of copper or of certain salts of copper or metals from Group I-A of the Periodic Table, in combination with the tertiary amines, increases the reactivity during polymerization of tetrafluoroethylene epoxide. Since the metal salts by themselves have no observable effect on the polymerization of tetrafluoroethylene epoxide, they may be added to the tetrafluoroethylene epoxide monomer under conditions expected to favor polymerization and no reaction is observed until the tertiary amine is added. Representative metal salts which may be used in the process of the invention are cupric carbonate, cupric fluoride, sodium fluoride, potassium carbonate, potassium fluoride. A preferred metal salt is cupric fluoride. If the salts contain water of hydration, it need not be removed before use.

The polyethers of the present invention are readily soluble at room temperature in fluorocarbon solvents such as perfluorodimethylcyclobutane, perfluorocyclohexane, perfluoroheptane, etc. This property makes them useful for applications such as coatings. Since the polyethers of the present invention are characterized by excellent thermal stability, chemical inertness, and dielectric properties, they are useful in such applications as lubricants, as antisoilants for fibers, and as plasticizers.

The following examples, in which parts and percents are by weight unless otherwise noted, are presented merely to describe specific embodiments of the present invention, and therefore are not intended as a limitation on the scope thereof. The inherent viscosities in this specification are measured at 30° C. on a solution containing 0.5 gm. of polymer dissolved in 100 ml. of mixed perfluorinated cyclic ethers commercially available as FC-75 from the Minnesota Mining and Mfg. Co.

Example 1

Into a dry, evacuated pressure flask equipped with a magnetic stirrer is introduced .023 gm. of commercial grade basic cupric carbonate $CuCO_3 \cdot Cu(OH)_2$. After cooling to −75° C., 11.4 gm. (.098 mole) of tetrafluoroethylene epoxide is introduced and then 1 ml. of mixed perfluorinated cyclic ethers (FC-75) is introduced. Triethyl amine 0.05 gm. (.000495 mole) is introduced and with stirring the temperature is raised to −55° C. over a 4-hour period, during which time the reaction mass becomes a brittle solid. During the next two hours the temperature is raised to −20° C. and the flask is evacuated. After heating to about 150° C. to remove volatiles, the greenish-white polymer is identified as polytetrafluoroethylene oxide by its infrared spectrum.

Examples 2 to 5

Four experiments are conducted according to the following general procedure, the specific details and results for each experiment being given in Table I.

Into a dry evacuated polymerization vessel is placed an amount of copper salt (metallic copper of Example 3 is supplied by the polymerization vessel), except for control Example 2 in which a catalyst adjuvant is not used. The vessel is evacuated and cooled with liquid nitrogen to about −196° C. Tetrafluoroethylene epoxide is distilled into the vessel, followed by triethylamine. The sealed vessel and contents are warmed to −80° C. by means of a Dry Ice/acetone bath and held at this temperature for 48 hours. The flask and contents are warmed to room temperature and volatile materials are removed by warming under vacuum.

Observation of the polymerization reaction medium (which could not be done for the copper vessel) after 24 hours show the presence of liquid for the control experiment and absence of same for the copper salt containing systems. Inherent viscosity data show that polymers obtained for both the copper and copper salt containing systems were of a higher molecular weight than for the adjuvant-free system.

In an independent experiment in which cuprous fluoride is absent, 100% conversion of the monomer is obtained, but the polymeric product has an inherent viscosity of only 0.042.

Example 8

Into a dry, evacuated flask cooled with liquid nitrogen to −196° C. is introduced 32 gms. (0.276 mole) of tetrafluoroethylene epoxide. Triethyl amine, 0.1327 gm. (.001314 mole), and .119 gm. of sodium fluoride are added. The flask and contents are warmed to −80° C. by means of a Dry Ice/acetone bath and held at this temperature without agitation for 24 hours. The flask and contents are warmed to room temperature and unreacted tetrafluoroethylene epoxide is vented. The white solid residual polytetrafluoroethylene oxide is dissolved in mixed perfluorinated cyclic ethers (FC-75), dried with an infrared lamp under vacuum, and identified by its infrared spectrum.

Example 9

Into a dry evacuated pressure flask equipped with a magnetic stirrer is introduced .0205 gm. of commercial grade basic cupric carbonate $CuCO_3 \cdot Cu(OH)_2$. After cooling to −77° C., 9.6 gm. (.083 mole) of tetrafluoroethylene epoxide is introduced and then 1 ml. of mixed perfluorinated cyclic ethers (FC-75) is introduced. N-ethyl piperidine 0.1031 gm. is introduced and with stirring the temperature is raised to −55° C. over a 4-hour period, during which time the reaction mass becomes solid. Dur-

TABLE I

| | Example | | | |
|---|---|---|---|---|
| | 2 | 3 | 4 | 5 |
| | Control | | | |
| Polymerization Vessel (Material of Construction) | "Pyrex" Glass | Copper | "Pyrex" Glass | "Pyrex" Glass. |
| Basic Copper Carbonate, $CuCO_3 \cdot Cu(OH)_2$ (pbw.) | None | None | .0069 | None. |
| Cupric Fluoride (pbw.) | do | do | None | .0069. |
| Tetrafluoroethylene Epoxide (pbw.) | 66 | 30 | 30 | 30. |
| Triethylamine (pbw.) | 0.1517 | 0.1587 | 0.0993 | 0.1001. |
| Appearance After 24 Hours of Polymerization | Liquid with some solids present. | | Brittle solid | Brittle solid. |
| Appearance After 48 Hours of Polymerization | Solid | Solid | Solid | Solid. |
| Yield, parts | 5.2 | 17.3 | 8.9 | 9.0. |
| Inherent Viscosity | 0.04 | 0.11 | 0.08 | 0.10. | pbw.=parts by weight.

Example 6

Into a dry, evacuated pressure flask at −70° C. is introduced 10 gm. (.0863 mole) of tetrafluoroethylene epoxide. To this is added with stirring .0175 gm. (.000173 mole) of triethyl amine and .008 gm. of potassium carbonate. The flask and contents are warmed to −60° C. and held there for 7 hours during which time the reaction mass becomes solid. The flask is evacuated and then gradually warmed to room temperature. The residue is dissolved in mixed perfluorinated cyclic ethers (FC-75) and then dried with an infrared lamp under vacuum. The solid product is identified as polytetrafluoroethylene oxide by its infrared spectrum.

Example 7

Into a dry, exacuted pressure flask at −78° C. containing .055 gm. (.000542 mole) of anhydrous cupric fluoride is condensed 22 gm. (0.19 mole) of tetrafluoroethylene epoxide. Triethylamine 0.1004 gm. (.000995 mole) is added and the flask and contents held at −78° C. for 86 hours without agitation during which time the contents solidify. The flask and contents are warmed to room temperature and opened. The conversion is 100%. The residue is dissolved in mixed perfluorinated cyclic ethers (FC-75) and then dried with an infrared lamp under vacuum. The solid product is identified as polytetrafluoroethylene oxide by its infrared spectrum and has an inherent viscosity of 0.157 (measured at 0.5% concentration in mixed perfluorinated cyclic ethers (FC-75) at 30° C.).

ing the next 2 hours the temperature is raised to about −10° C., and the flask is opened. Volatiles are removed by heating to about 150° C. The conversion of the monomer is 100%.

Example 10

Into a dry, evacuated pressure flask equipped with a magnetic stirrer is introduced 0.006 gm. of commercial grade basic cupric carbonate $CuCO_3 \cdot Cu(OH)_2$. After cooling to −77° C., 10 gm. (.086 mole) of tetrafluoroethylene epoxide is introduced and then 1 ml. of mixed perfluorinated cyclic ethers (FC-75) is introduced. Pyridine 0.0444 gm. is introduced and with stirring the temperature is raised to −53° C. during approximately 3½ hours during which time the reaction mass becomes solid. The flask and contents are raised to room temperature, opened, and heated to about 150° C. to remove volatiles. The conversion of the monomer is about 100%.

Other tertiary amines and metal salts as hereinbefore defined can be employed in the foregoing examples, and similar results will be obtained.

As many apparently widely different embodiments of this invention may be made without departing from the spirit and scope thereof, it is to be understood that this invention is not limited to the specific embodiments except as defined in the appended claims.

What is claimed is:
1. A process comprising contacting tetrafluoroethylene epoxide at a temperature of about −110° C. to −30° C. with 0.0005 to 0.05 mole per mole of epoxide of tertiary amine selected from the group consisting of trimethyl- amine, triethylamine, tributylamine, trihexylamine, N-methylmorpholine, N,N-dimethylpiperazine, N-ethylpiperidine, pyridine, 2,6-dimethylpyridine, and 2,4,6-trimethylpyridine in the presence of from about 0.0005 to about 0.01 gram equivalents per mole of said epoxide of copper or a metal salt, the metal being selected from the group consisting of copper and Group I–A metals and the salt being selected from the group consisting of fluoride and carbonate, and obtaining as a result thereof a polymer of tetrafluoroethylene epoxide.

2. The process as recited in claim 1 wherein said tertiary amine is triethylamine.

3. The process as recited in claim 1 wherein said tertiary amine is N-ethylpiperidine.

4. The process as recited in claim 1 wherein said metal salt is cupric fluoride.

5. The process as recited in claim 1 wherein said metal salt is cupric carbonate.

6. The process as recited in claim 1 wherein said tertiary amine is dissolved in an inert solvent consisting of mixed perfluorinated cyclic ethers.

7. A process comprising contacting tetrafluoroethylene epoxide at a temperature of about $-110°$ C. to $-30°$ C. with 0.0005 to 0.05 mole per mole of epoxide of tertiary amine selected from the group consisting of trimethylamine, triethylamine, tributylamine, trihexylamine, N-methylmorpholine, N,N-dimethylpiperazine, N-ethylpiperidine, pyridine, 2,6-dimethylpyridine, and 2,4,6-trimethylpyridine in the presence of from about 0.005 to 0.01 gram equivalents per mole of said epoxide of copper and obtaining as a result thereof a polymer of tetrafluoroethylene epoxide.

References Cited
UNITED STATES PATENTS

| | | | |
|---|---|---|---|
| 2,987,489 | 6/1961 | Bailey et al. | 260—2 |
| 3,052,650 | 9/1962 | Wear et al. | 260—47 |
| 3,067,174 | 12/1962 | Sullivan | 260—2 |
| 3,135,705 | 6/1964 | Vandenberg | 260—2 |
| 3,284,374 | 11/1966 | Daimon et al. | 260—2 |
| 3,293,306 | 12/1966 | Le Bleu et al. | 260—615 |

WILLIAM H. SHORT, *Primary Examiner.*

T. PERTILLA, *Assistant Examiner.*